April 13, 1926.
W. G. MYLIUS
MAXIMUM DEMAND METER
Filed Jan. 24, 1921
1,580,523
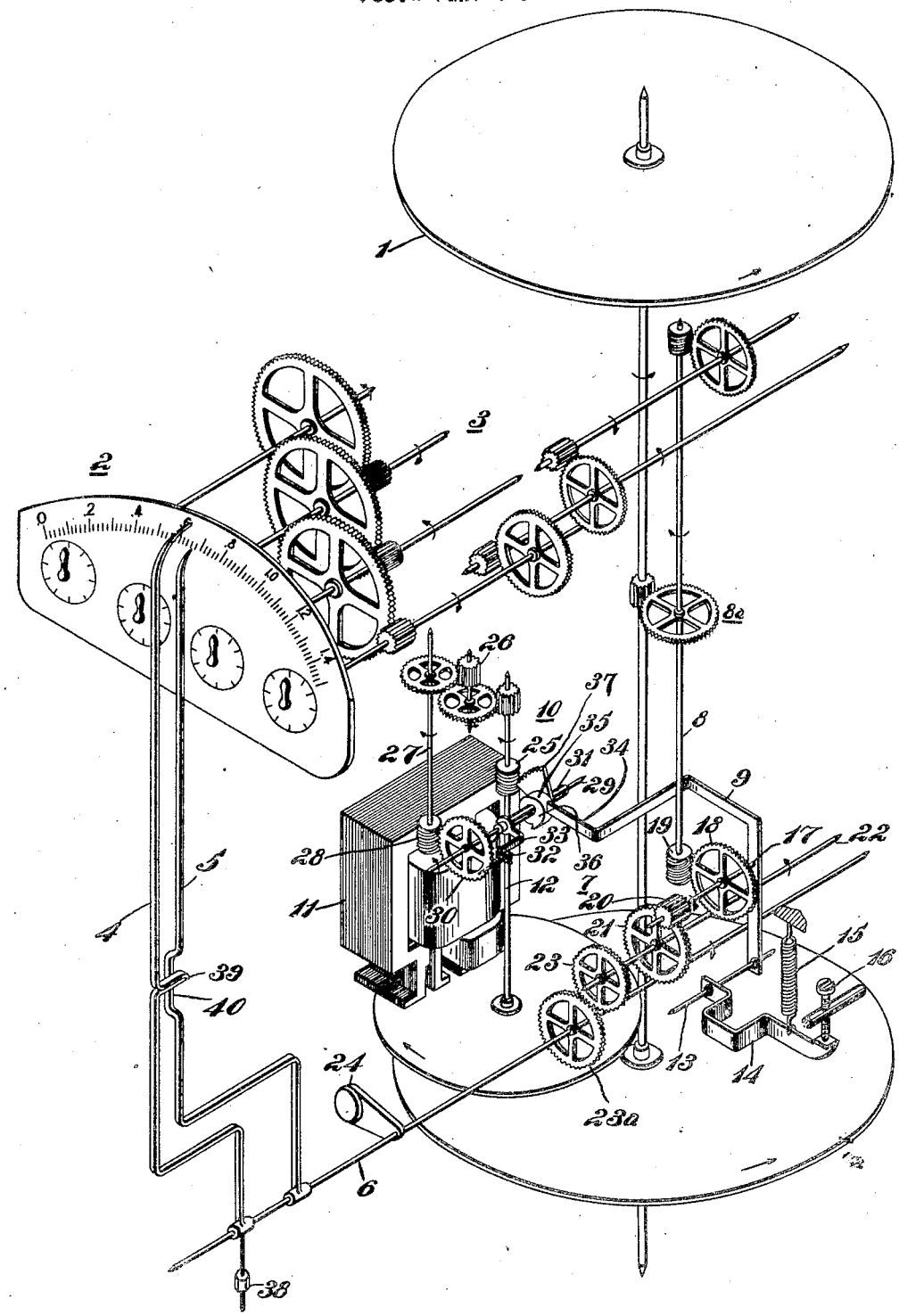
WITNESSES:
John P. Wurmb.
F. H. Miller
INVENTOR
Walter G. Mylius.
BY
Wesley G. Carr
ATTORNEY Patented Apr. 13, 1926.

1,580,523

UNITED STATES PATENT OFFICE.

WALTER G. MYLIUS, OF WILKINSBURG, PENNSYLVANIA, ASSIGNOR TO WESTINGHOUSE ELECTRIC & MANUFACTURING COMPANY, A CORPORATION OF PENNSYLVANIA.

MAXIMUM-DEMAND METER.

Application filed January 24, 1921. Serial No. 439,327.

*To all whom it may concern:*

Be it known that I, WALTER G. MYLIUS, a citizen of the United States, and a resident of Wilkinsburg, in the county of Allegheny and State of Pennsylvania, have invented a new and useful Improvement in Maximum-Demand Meters, of which the following is a specification.

My invention relates to electrical measuring instruments, and particularly to maximum-demand meters of the indicating type.

The object of my invention is to provide a device of the above indicated character that shall be simple in construction and effective in operation, and that shall cause a resetting pointer to be quickly disengaged from the meter mechanism and returned to its initial position at which it is quickly reengaged to the meter mechanism.

In practicing my invention, I provide an indicating member or pointer that is connected, through gear mechanism, to the actuating meter element to be positively advanced by the latter. A mechanism for disengaging certain of the gears, between the actuating meter element and the indicating member, is adapted to be periodically actuated by momentary operative connection to a member that is actuated at a relatively high constant speed by the motor device. This momentary connection is effected by a second movable member that is also driven by the motor device at a relatively slower constant speed.

The single figure of the accompanying drawing is a perspective view of a portion of a maximum demand meter embodying my invention.

In general, an instrument embodying my invention comprises an actuating meter element 1, an integrating mechanism 2 that is connected to the element 1 through suitable gear mechanism 3 for indicating the total energy consumption of the circuit, a pointer or indicating member 4 for indicating the integrated maximum power demand of the circuit and a resetting pointer 5 that is connected to the actuating meter element 1 through a shaft 6, gear mechanism 7, a shaft 8 and gears 8a. A lever member 9 is provided for disengaging the gear mechanism 7 from the gear mechanism 8a to, thus periodically disconnect the element 1 from the pointer 5 relatively quickly. A constant-speed electric motor device 11 is provided for actuating a timing mechanism 10 that controls the movement of the lever 9.

Since the integrating mechanism 2 and its means of connection to the meter element 1 are old in the art, no detailed description thereof is deemed necessary. Also, the electric-motor device 11, that is fully set forth in the patent application of Harry P. Sparkes, Serial No. 421,882, filed Nov. 5, 1920 and assigned to the Westinghouse Electric & Mfg. Co., actuates a shaft 12 at substantially constant relatively-high speed, irrespective of voltage variations in its energizing circuit.

The lever 9, while shown as having several right-angle bends to avoid certain structure in the meter, (not shown), functions as an ordinary bell-crank lever connected to a pivot pin or shaft 13 that is provided with suitable bearings (not shown). The shaft 13 is provided with an arm 14 that is biased in one direction, by a spring 15, and rendered adjustable by means of a set screw or other suitable device 16. The arm 9 constitutes a bearing for a shaft 17 on which a worm wheel 18 and a pinion 20 are mounted. The worm wheel 18 normally engages a worm screw 19 on the shaft 8 which is connected, through the gear mechanism 8a, to the meter element 1. The pinion 20 engages a gear wheel 21 that is mounted on a shaft 22 upon which a gear wheel 23 is also mounted. The gear wheel 23 engages a gear wheel 23a that is mounted on the shaft 6 to actuate the pointer 5 in accordance with the movement of the meter element 1.

When moved in a clockwise direction, as viewed from the front of the meter, the lever 9 causes the worm wheel 18 to be disengaged from the worm screw 19 to interrupt the positive driving connection between the pointer 5 and the meter element 1 and to permit the pointer 5 to be quickly returned to its initial position by reason of the relation thereto of a weight member 24 mounted on the shaft 6.

The shaft 12, constituting the main or primary relatively high-speed shaft of the motor device 11, carries a worm screw 25 that is operatively connected, through a reduction-gear mechanism 26, to an auxiliary shaft 27 on which a worm screw 28 is mounted. A shaft 29, disposed in suitable bearings (not shown) and extending at substantially right angles to the shafts 12 and 27, carries a worm wheel 30 rigidly secured thereto and a sleeve 31 loosely mounted thereon. The worm wheel 30 engages the worm screw 28 and carries a laterally projecting pin or member 32 adapted to periodically engage a bell-crank lever arm 33 connected to the sleeve 31. The end 34 of the lever 9 is normally biased, by the spring 15, to bear against a cam 35 having a projection 36 and mounted on the sleeve 31. A gear sector 37 is also secured to the sleeve 31 and is adapted to engage the worm screw 25 when the pin 32 engages the arm 33.

In operation, since the shaft 12 rotates at a relatively high constant speed, the time of a complete rotation of the worm wheel 30 may be adjusted, as desired, by suitably proportioning the gear mechanism 26.

As shown, the pin 32 is in such position that, with slight rotation of the worm wheel 30, the lever 33 and the sleeve 31 will be so turned as to cause the sector gear 37 to engage the worm screw 25, and, since the latter is traveling at a relatively high rate of speed, the cam 35 will be given a relatively quick turning movement. This movement will cause the projection 36 to engage the end 34 of the arm 9 and the latter to turn about its pivot shaft 13 to quickly disengage the worm wheel 18 from the worm screw 19 and to thereby permit the pointer 5 to return quickly to its initial position. During the engagement of the sector gear 37 with the worm screw 25, the lever 33 will be advanced with respect to the pin 32 and again engaged by the pin at the end of the next rotation of the gear wheel 30.

The pointer 4 is relatively movably mounted on the shaft 6, in slight frictional engagement therewith, and is provided with an adjustable balance-weight member 38. A lateral projection or bent portion 39 on the pointer 4 is adapted to be engaged by a portion 40 of the pointer 5 to be moved to a position of maximum power demand during any given interval. This construction permits the pointer 4 to remain in the position of maximum indicated power demand at the end of an interval, when the pointer 5 is reset.

The meter element 1 is actuated in accordance with the power being measured and, through the gear mechanism 8a, the worm screw 19, worm wheel 18, pinion 20, gear wheels 21, 23 and 23a, moves the pointer 5 a distance proportional to the energy measured during any predetermined interval of time, such as 15 or 30 minutes. The pointer 5 actuates the pointer 4 as hereinbefore set forth. After the pointer 5 has been actuated for the desired demand interval, the timing mechanism 10 effects the quick disengagement of the meter element 1 from the shaft 6 and permits the weight member 24 to return the pointer 5 to its initial position. Thus, the pointer 5 indicates the integrated demand for energy at any instant, and the pointer 4 indicates the maximum demand of all of the successive indications of the pointer 5.

In order for the pointer 5 to accurately indicate the energy being measured by the meter element 1, it is essential that it be connected to the meter element 1 at all times. However, it is necessary to reset the pointer 5 periodically to obtain the demand over predetermined intervals of time. In view of this, I have provided the mechanism 10, whereby the pointer 5 is quickly disconnected and reconnected to the meter element, thus reducing to a minimum the time of disconnection.

The rapid movement of the cam 35 causes the worm gear 18 and the worm screw 19 to be quickly disengaged, and the pointer 5, assisted by the weight member 24, to be quickly reset while the cam projection 36 is passing the end 34 of the lever 9. As it passes the projection 36, the lever 9, by reason of the force imparted thereto by the spring 15, causes the worm gear 18 and the worm screw 19 to be quickly reengaged and the pointer 5 to be again operatively connected to the meter element; the whole operation occurring quickly and reducing the loss of time between the periods for which the instrument is calibrated.

While I have shown and described a particular form of my invention, changes may be effected therein without departing from the spirit and scope thereof, as set forth in the appended claims.

I claim as my invention:

1. The combination with an actuating element and an indicating member positively moved thereby, of a constant-speed device, means actuated at a relatively high speed by said device for disconnecting the indicating member from the actuating element, and means actuated by said device at a relatively slow speed compared to said high-speed means for controlling said disconnecting means.

2. In an electric meter, the combination with an actuating meter element and an indicating member operatively geared thereto to be positively advanced thereby, of a constant-speed, electric-motor device, means mechanically actuated at relatively high speed by the motor for relatively quickly disconnecting the indicating member from the actuating element, and means mechanically actuated by the motor at relatively slow speed compared to said high-speed means for so controlling said disconnecting means as to cause the indicating member to be reset at predetermined intervals.

3. In a meter, the combination with an actuating meter element, an indicating member and gear mechanism for connecting the meter element to the indicating member, of means for effecting the periodic resetting of the indicating member comprising parallel main and secondary shafts, means for rotating said shafts at predetermined constant speeds, co-operating relatively movable members one of which is operatively connected to one of said shafts and another of which is periodically temporarily connected to the other shaft, a member for moving certain of the gears of said gear mechanism out of engagement and means on one of said relatively movable members for actuating said gear-moving member.

4. In a meter, the combination with an actuating meter element, an indicating member and gear mechanism for connecting the meter element to the indicating member, of means for effecting the periodic resetting of the indicating member comprising a plurality of members movable at different predetermined constant speeds, co-operating relatively movable members, one of which is operatively connected to one of said constant-speed members and another of which is periodically temporarily connected to the other, means for disconnecting said indicating member from said actuating meter element and means responsive to movement of one of said relatively movable members for actuating said disconnecting means.

5. In a meter, the combination with an actuating meter element, an indicating member, means for transmitting motion between the element and the indicating member and means for quickly resetting the indicating member, of means for rendering the resetting of the indicating member periodic, comprising a constant-speed motor, means actuated by the motor at a relatively high speed for disconnecting the indicating member from the actuating meter element and rendering said resetting means effective, and means actuated by the motor at a relatively low constant speed for periodically operatively connecting said high-speed means to the motor.

6. In a meter, the combination with an actuating meter element, an indicating member and mechanism for connecting the element to the indicating member, of means for effecting the periodic resetting of the indicating member comprising a main movable member, means for moving said main movable member at a predetermined constant speed, a secondary movable member, speed-reducing means connecting said movable members, means for operative connection to the main movable member for disconnecting said mechanism between the actuating element and the indicating member, and means operatively connected to the secondary movable member for periodically actuating said disconnecting means.

7. In a meter the combination with an actuating meter element, an indicating member and gear mechanism for connecting the element to the indicating member, of means for effecting the periodic resetting of the indicating member comprising a main shaft, means for rotating said shaft at a predetermined constant speed, a worm screw on the main shaft, a secondary shaft parallel to the main shaft, reduction gearing connecting said shafts, a secondary worm screw on the secondary shaft, a tertiary shaft disposed at right angles to said shafts, a sleeve loosely mounted on the tertiary shaft, a worm wheel on the tertiary shaft meshing with the secondary worm screw, a projection on said worm wheel, an arm on said sleeve for engagement with said projection, a sector gear member on said sleeve for periodic engagement with said main worm screw, a cam on said sleeve, a lever arm engaging said cam and connected to said gear mechanism for interrupting the movement of parts thereof in response to movement of the cam, and means for biasing said lever arm to render said gear-mechanism parts operative.

In testimony whereof, I have hereunto subscribed my name this 17th day of January, 1921.

WALTER G. MYLIUS.